(12) United States Patent
Petschnigg et al.

(10) Patent No.: US 7,999,807 B2
(45) Date of Patent: Aug. 16, 2011

(54) 2D/3D COMBINED RENDERING

(75) Inventors: Georg F. Petschnigg, Redmond, WA (US); Ashesh P. Bakshi, Redmond, WA (US); Damien N. Berger, Redmond, WA (US); Matthew W. Kernek, Redmond, WA (US); Stephen B. Coy, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/301,799

(22) Filed: Dec. 12, 2005

(65) Prior Publication Data

US 2007/0057939 A1 Mar. 15, 2007

Related U.S. Application Data

(60) Provisional application No. 60/715,916, filed on Sep. 9, 2005.

(51) Int. Cl.
*G06T 15/50* (2011.01)
(52) U.S. Cl. ...................................... 345/426
(58) Field of Classification Search .................. None
See application file for complete search history.

(56) References Cited

U.S. PATENT DOCUMENTS

| | | | | |
|---|---|---|---|---|
| 5,625,711 | A * | 4/1997 | Nicholson et al. | 382/224 |
| 5,831,633 | A | 11/1998 | Van Roy | 345/441 |
| 5,999,190 | A | 12/1999 | Sheasby et al. | 345/431 |
| 6,014,143 | A | 1/2000 | Naqvi et al. | 345/424 |
| 6,169,552 | B1 * | 1/2001 | Endo et al. | 345/427 |
| 6,204,851 | B1 * | 3/2001 | Netschke et al. | 345/419 |
| 6,208,347 | B1 | 3/2001 | Migdal et al. | 345/419 |
| 6,226,005 | B1 | 5/2001 | Laferriere | 345/426 |
| 6,271,847 | B1 | 8/2001 | Shum et al. | 345/418 |
| 6,281,903 | B1 | 8/2001 | Martin et al. | 345/421 |
| 6,522,787 | B1 | 2/2003 | Kumar et al. | 382/268 |
| 6,633,300 | B1 | 10/2003 | Tomack et al. | 345/581 |
| 6,677,944 | B1 * | 1/2004 | Yamamoto | 345/422 |
| 6,707,458 | B1 | 3/2004 | Leather et al. | 345/582 |
| 6,741,242 | B1 | 5/2004 | Itoh et al. | 345/419 |
| 6,831,635 | B2 | 12/2004 | Boyd et al. | 345/418 |
| 7,009,611 | B2 * | 3/2006 | Di Lelle | 345/467 |
| 7,148,899 | B2 * | 12/2006 | Dumesny et al. | 345/582 |
| 2002/0154122 | A1 | 10/2002 | Di Lelle | 345/467 |
| 2002/0154132 | A1 | 10/2002 | Demesny et al. | 345/582 |

(Continued)

FOREIGN PATENT DOCUMENTS

JP 04-360278 12/1992

(Continued)

OTHER PUBLICATIONS

Gooch, B., Sloan, P., Gooch, A., Shirley, P., Riesenfeld, R., Interactive Technical Illustration, Apr. 1999, ACM Symposium on Interactive 3D Graphics, pp. 31-38 & 220.*

(Continued)

*Primary Examiner* — Said Broome
(74) *Attorney, Agent, or Firm* — Merchant & Gould

(57) ABSTRACT

A system combines 2D and 3D modeling in rendering shapes and includes: a 3D modeling factory to generate a 3D model of selected shape parameters or features; a front face factory to generate 2D text and text effects, and some 2D shape effects; a ground plane factory to generate effects that are rendered on a ground plane of a shape; and a rasterizer/compositing engine to combine 2D and 3D effects generated by the front face factory, ground plan factory, and the 3D modeling factory.

20 Claims, 3 Drawing Sheets

U.S. PATENT DOCUMENTS

| | | | |
|---|---|---|---|
| 2002/0154214 A1 | 10/2002 | Scallie et al. | 348/51 |
| 2003/0038798 A1 | 2/2003 | Besl et al. | 345/420 |
| 2004/0082870 A1 | 4/2004 | Rudy et al. | 600/509 |
| 2004/0208362 A1 | 10/2004 | Suzuki | 382/166 |

FOREIGN PATENT DOCUMENTS

| | | |
|---|---|---|
| JP | 11-296696 | 10/1999 |
| JP | 2000-11205 | 1/2000 |
| JP | 2001-273520 | 10/2001 |
| WO | WO 00/63848 | 10/2000 |

OTHER PUBLICATIONS

Matching Tree Shadows to Ground Planes, Jul. 9, 2003, http://www.gardenhose.com/pdf/ShadowsTute.pdf, pp. 1-5.*

PhotoPlus Companion 8.0, 2002, Serif(Europe),Ltd., http://www.serif.com/community/pdfs/PhotoPlus8.pdf, pp. 1-13 & 106-112.*

Rendering Complexity in Computer-Generated Pen-and-Ink Illustrations; Abstract (9 pgs) http://www.cs.ucdavis.edu/~ma/papers/npar04.pdf.

Harness the Autodesk power (6 pgs) http://www.gwba.com/autodesk2.html.

DirectX 9.0; Introducing the New Managed Direct3D Graphics APJ in the .Net Framework (12 pgs) http://msdn.microsoft.com/msdnmag/issues/03/07/DirectX90/default.aspx.

Kylander, K. et al.; "*GIMP: The Official Handbook*"; The Gimp user's manual version 1.0.1—Chapters 8, 11, 20, 36; Nov. 3, 1999; XP002571168.

Supplemental Search Report dated Apr. 12, 2010, issued in EP Appl. No. 06814359.3.

Office Action dated Aug. 2008, in CL Appl. No. 2326-2006, *w/English communication-translation*.

Office Action dated Aug. 30, 2010, in MX Appl. No. MX/a/2008/003340, *w/English communication-translation*.

Office Action dated Jun. 11, 2010, issued in EP Appl. 06814359.3.

Office Action dated Mar. 9, 2010, in CN Appl. No. 200680032786.9, *w/Translation*.

Office Action dated Oct. 22, 2010, in AU Appl. No. 2006287409.

Office Action dated Oct. 9, 2009, in NZ Appl. No. 566364.

Office Action dated Sep. 2009, in CL Appl. No. 2326-2006, *w/English communication-translation*.

Office Action dated Jul. 29, 2010, in Russian Appl. No. 2008108993 (14917.0290ruwo), *w/Translation*.

Office Action mailed Apr. 15, 2011, JP Application No. 2008-530230, w/Translation.

\* cited by examiner

3D SHAPE

3D SHAPE WITH CONTOURS BASED ON 2D GEOMETRY

US 7,999,807 B2

2D/3D COMBINED RENDERING

BACKGROUND

There are a number of tools in existence today that let users create professional business graphics such as a presentation. An approach for adding polish to shapes and images is to apply 3D techniques. This is usually done in two ways: one is the use of simulated 3D effects on 2D bitmaps, which results in 3D looking shapes or images, without a real 3D model. The resulting simulated 3D graphics may not appear to be sufficiently 3D for some uses. The other approach is to use a full 3D model. Here the users build 3D models of the items to be displayed. This approach typically requires that the users be skilled in 3D modeling and in using the 3D modeling tool. This background information is not intended to identify problems that must be addressed by the claimed subject matter.

SUMMARY

This summary is provided to introduce a selection of concepts in a simplified form that are further described below in the Detail Description Section. This summary is not intended to identify key features or essential features of the claimed subject matter, nor is it intended to be used as an aid in determining the scope of the claimed subject matter.

According to aspects of various described embodiments, a system that combines 2D and 3D modeling in rendering shapes is provided. In one aspect, the system includes: a 3D modeling factory to generate a 3D model of selected shape parameters or features; a front face factory to generate 2D text and text effects, and some 2D shape effects (e.g., fill effects); a ground plane factory to generate effects that are rendered on a ground plane of a shape; and a rasterizer/compositing engine to combine 2D and 3D effects generated by the front face factory, ground plan factory, and the 3D modeling factory. When the system receives a shape with 3D effects, the front face factory disassembles the shape into the following parts: text included in the shape (if any); the 2D surface of the front face (i.e., the surface effects of the front face of the shape); the 3D effects (if any) applied to the text; any ground plane effects (e.g., shadow, glow, reflection effects that are rendered into a ground plane of the shape); and the geometry of the shape (e.g., circle, rectangle, arrow, etc.).

The front face factory renders any 2D text effects (e.g. shadow, glow, reflection); any 2D shape effects; any 2D surface effects (e.g., fill, gradient fill, image, etc.) and the 2D geometry of the shape; and creates a texture map using the rendered 2D text effects and 2D surface effects for the front surface of the shape. The ground plane factory generates a ground plane for the 2D shape effects (if any). In addition, if the text has 3D effects applied, the ground plane factory generates a ground plane for the 2D text effects. The 3D modeling factory generates a 3D model from the 2D shape geometry by defining extrusion and beveling properties of the shape. The 3D modeling factory then generates coordinates for mapping the texture onto the front face of the 3D model. The rasterizer/compositing engine then combines the resulting shape from the 3D modeling factory (i.e., with 3D geometry and 2D texture map) with the ground plane(s) from the ground plane factory. The rasterizer/compositing engine uses the texture coordinates to map the texture onto the 3D model.

Embodiments may be implemented as a computer process, a computer system (including mobile handheld computing devices) or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Various embodiments are described more fully below with reference to the accompanying drawings, which form a part hereof, and which show specific exemplary embodiments for practicing various embodiments. However, other embodiments may be implemented in many different forms and should not be construed as limited to the embodiments set forth herein; rather, these embodiments are provided so that this disclosure will be thorough and complete. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the embodiment. Accordingly, the logical operations making up the embodiments described herein are referred to alternatively as operations, steps or modules.

Exemplary 2D/3D Combined Rendering System

A problem with the aforementioned simulated 3D and the 3D modeling approaches is that they are incomplete with regard to typical business uses. For example, users may have shapes with a 2D effect (e.g., a gradient) that they want to put into 3D perspective for effect, or a complex 3D model for which they want to use a picture texture map, a gradient effect, or a simple shadow. The simulated 3D approach and the 3D modeling approach separately only provide a portion of a solution for the above example scenario.

Embodiments presented below allow the use of both 3D and 2D effects combined into one pipeline, which generates professional looking business graphics. The user need not have a detailed understanding of 3D modeling (which is likely among typical business users) in order to use embodiments of the system.

Figure 1:
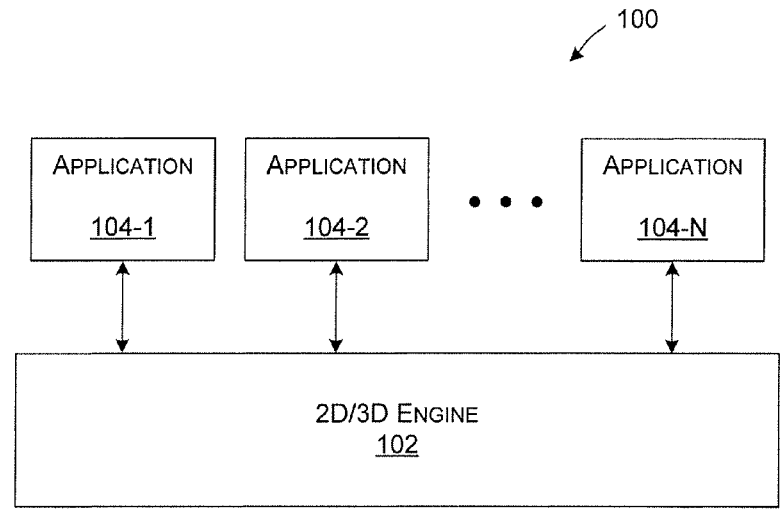
FIG. 1 is a block diagram representing an exemplary system with multiple applications and a 2D/3D engine, according to an embodiment.

FIG. 1 illustrates an exemplary system 100 that that combines 2D and 3D modeling in rendering shapes. In this embodiment, system 100 includes a 2D/3D engine 102, and one or more application programs indicated as applications 104-1 through 104-N in FIG. 1. Applications 104-1 through 104-N use 2D/3D engine to provide 3D effects to 2D shapes and shape effects inputted by users of applications 104-1 through 104-N. In addition, 2D/3D engine 102 can also provide 3D effects to text associated with the shapes. In accordance with one embodiment, 2D/3D engine 102 receives 2D shape input and generates a 3D model of some portions of the 2D shape so that the rendering output contains portions that are generated from 2D shapes and effects (and 2D text and effects, if any) and portions that are generated from the 3D model. This combined approach is unlike the aforementioned simulated 3D approach (which does not include a 3D model) and the purely 3D modeling approach. An example implementation of 2D/3D engine 102 is described below in conjunction with FIG. 2.

Although a "shared" 2D/3D engine embodiment is described above, in alternative embodiments, each application that can generate 3D shapes may have an embedded 2D/3D engine as opposed to separate 2D/3D engine 102:

Exemplary Components of a 2D/3D Engine

Figure 2:
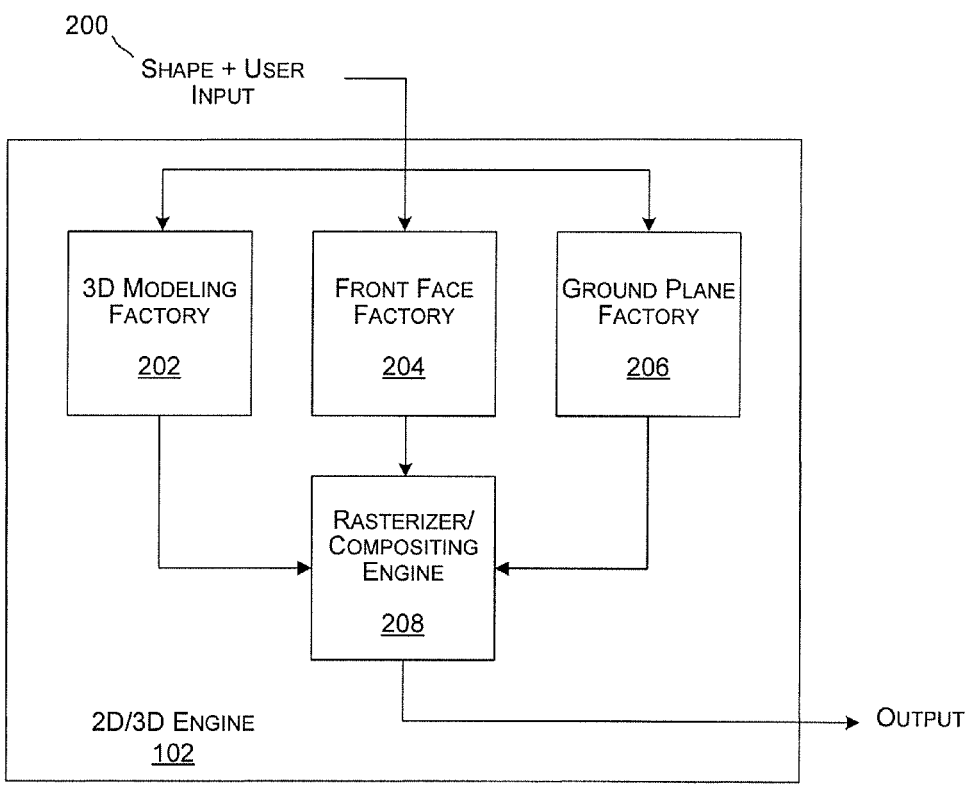
FIG. 2 is a block diagram representing exemplary components of the 2D/3D engine of FIG. 1, according to an embodiment.

FIG. 2 illustrates exemplary components of 2D/3D engine 102 (FIG. 1) according to one embodiment. In this embodiment, 2D/3D engine 102 includes a 3D modeling factory 202, a front face factory 204, a ground plane factory 206 and a rasterizer/compositing engine 208. 3D modeling factory 202 generates a 3D model of selected shape parameters or features. Front face factory 204 generates 2D text and text effects, and some 2D shape effects (e.g., fill effects). Ground plane factory 206 generates effects that are rendered on a ground plane of a shape. Rasterizer/compositing engine 208 combines 2D and 3D effects generated by front face factory 204, ground plan factory 206, and 3D modeling factory 202.

In operations, when 2D/3D engine 102 receives a shape with 3D effects (e.g., as selected by a user using a user interface provided by an application such as application 104-1 of FIG. 1), front face factory 204 disassembles the shape into the following parts: text included in the shape (if any); the 2D surface of the front face (i.e., the surface effects of the front face of the shape); the 3D effects (if any) applied to the text; any ground plane effects (e.g., shadow, glow, reflection effects that are rendered into a ground plane of the shape); and the geometry of the shape (e.g., circle, rectangle, arrow, etc.).

In this embodiment, front face factory 204 renders: any 2D text effects (e.g. shadow, glow, reflection); any 2D shape effects; any 2D surface effects (e.g., fill, gradient fill, image, etc.) and the 2D geometry of the shape; and creates a texture map using the rendered 2D text effects and 2D surface effects for the front surface of the shape. In accordance with this embodiment, front face factory 204 generates the texture map so that the front surface of the shape retains its 2D surface effects (e.g., fill color) for all orientations of the shape under any simulated lighting conditions. For typical business users, this 2D surface effect preservation feature is desirable (even though it may appear less realistic) because the inputted 2D surface effect (e.g., color) is the effect that the users actually want as a result (as opposed to how the surface effect might appear when the shape with this surface effect is re-oriented).

Further, in one embodiment, front face factory 204 dilates textures (e.g., containing the fill effect or image) by one pixel to make sure all parts of the front face of the 3D model are covered by the image fill.

In this embodiment, ground plane factory 206 generates a ground plane for the 2D shape effects (if any). In addition, if the text has 3D effects applied, ground plane factory 206 generates a ground plane for the 2D text effects. Ground plane generator 206 takes 2D effects such as shadow, blur, and reflection and draws them into a background plane. When a 3D effect is added to the shape by 3D modeling factory (e.g., as described below), a ground plane is created and the 2D shape effects such as shadow, blur, and reflection are rendered on the ground plane. The ground plane would be rendered behind the shape.

In this embodiment, 3D modeling factory 202 generates a 3D model from the 2D shape geometry by defining extrusion and beveling properties of the shape. The 3D modeling factory then generates coordinates for mapping the texture onto the front face of the 3D model. For example, the 3D modeling factory will "wrap" the 2D surface effects (e.g., a picture or color) around the bevel.

Figure 3:
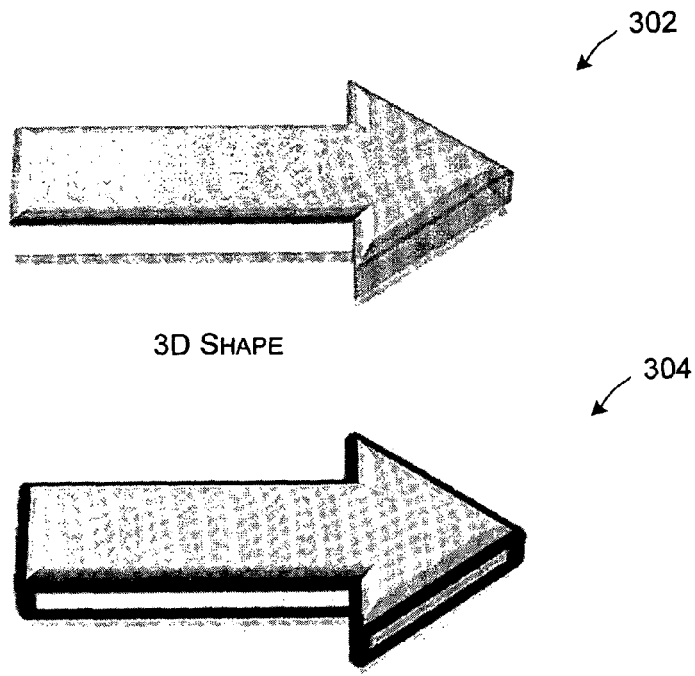
FIG. 3 is a diagram representing a 3D shape with contours based on the shape's 2D geometry, according to an embodiment.

Further, in one embodiment, 3D modeling factory 202 generates contours of 3D shapes based on their underlying 2D geometry. An example of contours is illustrated in FIG. 3. In this example, when a user enables the contours feature for a shape, the "outline" of the shape is made thicker. The color of the contour is user definable. For example, white contours can be used to set off dark shapes over a dark background. Rather than generate the contours during the 3D modeling, the contours are generated from the underlying 2D shape (shown as shape 302) and applied to the extrusion and beveling. The result is illustrated as shape 304.

In this embodiment, rasterizer/compositing engine 208 then combines the resulting shape from 3D modeling factory 202 (i.e., with 3D geometry and 2D texture map) with the ground plane(s) from ground plane factory 206. The rasterizer/compositing engine 208 uses the texture coordinates to map the texture onto the 3D model.

Exemplary Components for Rendering 3D Text

Figure 4:
FIG. 4 is a diagram representing 3D text and text effects applied to a shape's text, according to an embodiment.

In one embodiment (not shown), there is a separate front face factory, a ground plane factory and a 3D modeling factory for 3D text. The front face factory renders the 2D effects of the text. The 3D modeling factory generates a 3D model of the text by defining extrusion and beveling properties of the text and mapping the 2D text effects on the 3D model of the text. The ground plane factory creates a separate ground plane for the 3D text, and then 2D effects such as shadow, blur and reflection are rendered on this ground plane. This ground plane would sit on top of the shape so that the text effects will be viewable. An example of 3D text is illustrated in FIG. 4.

Exemplary Source Operational Flow for Operating System/Driver Installation

Figure 5:
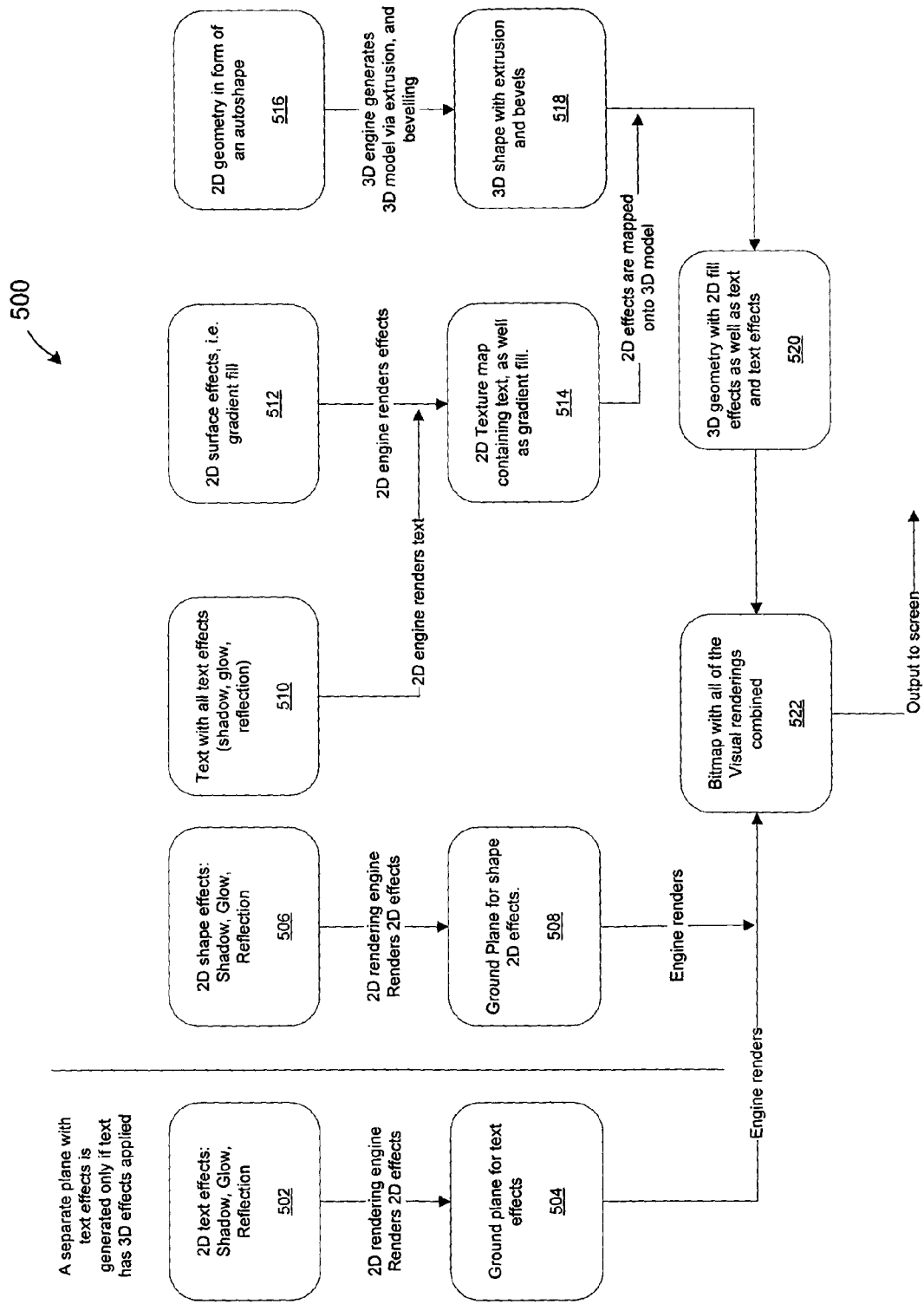
FIG. 5 is a flow diagram representing operational flow in generating a 3D graphic from a 2D shape input, according to an embodiment.

FIG. 5 is a flow diagram representing an operational flow 500 in generating a 3D graphic from a 2D shape input, according to an embodiment. Operational flow 500 may be performed in any suitable computing environment. For example, operational flow 400 may be executed by a system such as 2D/3D engine 102 (FIG. 2). Therefore, the description of operational flow 500 may refer to at least one of the components of FIG. 2. However, any such reference to components of FIG. 2 is for descriptive purposes only, and it is to be understood that the implementations of FIG. 2 are a non-limiting environment for operational flow 500. In this example operational flow, a user using an application such as application 104-1 (FIG. 1) has created a shape that is to be rendered.

At a block 502, if the shape has text, a 2D rendering engine renders any 2D text effects that are to be applied to the text (e.g., as enabled by a user via the application). In one embodiment, the 2D rendering engine is a standard 2D rendering engine and is part of a front face factory such as front face factory 204 (FIG. 2).

At a block 504, if 3D text effects are applied (e.g., as enabled by a user), a ground plane factory (e.g., similar to ground plane factory 206 but directed to text instead of shapes) creates a 3D ground plane for the text. This ground plane is separate from the ground plane of the shape.

Blocks 502 and 504, in this example, are performed only if 3D effects are to be applied to the shape's text.

At a block 506, 2D shape effects are applied to the shape. In one embodiment, the aforementioned 2D rendering engine applies the 2D shape effects (e.g., shadow effect, glow effect, reflection effect) to the shape.

At a block 508, a shape ground plane is created and the 2D shape effects are associated with the shape ground plane. In one embodiment, a ground plane factory such as ground plane factory 206 creates the ground plane and associates the 2D shape effects (e.g., shadow effect, glow effect, reflection effect) to the shape ground plane.

At a block 510, is the same as block 502, but is performed in scenarios in which there are no 3D effects being applied to the shape's text.

At a block 512, 2D surface effects are applied to the shape. In one embodiment, the 2D rendering engine of the front face factory applies the surface effects (e.g., fill, gradient fill, image, etc.) to the shape.

At a block 514, a texture map is created using the 2D text effects and 2D surface effects from blocks 510 and 512. In one embodiment, the front face factory creates the texture map.

At a block 516, a 2D geometry is obtained from the shape. In one embodiment, a 3D modeling factory such as 3D modeling factory 202 (FIG. 2) obtains the 2D geometry from the shape.

At a block 518, a 3D model is generated from the 2D geometry obtained at block 516.

In one embodiment, the aforementioned 3D modeling factory generates the 3D model by defining extrusion and bevel parameters for the shape.

At a block 520, the texture map from block 514 is mapped onto the 3D model from block 518. In one embodiment, the 3D modeling factory maps the texture map onto the 3D model so that the front face of the shape has the 2D text, text effects, and surface effects from blocks 510 and 512. In addition, the 3D modeling factory can also apply the texture map to 3D features such as the extrusion and bevel (e.g., "wrap" the fill around the bevels and extrusions).

At a block 522, a bitmap is created from the 3D shape from block 520 combined with the ground plane from block 508. In one embodiment, a rasterizer/compositing engine such as rasterizer/compositing engine 208 (FIG. 2) creates the bitmap. In addition, in scenarios in which 3D effects are applied to the shape's text, the rasterizer/compositing engine also uses the ground plane from block 504 to create the bitmap.

Although operational flow 500 is illustrated and described sequentially in a particular order, in other embodiments, the operations described in the blocks may be performed in different orders, multiple times, and/or in parallel. Further, in some embodiments, one or more operations described in the blocks may be separated into another block, omitted or combined.

Reference has been made throughout this specification to "one embodiment," "an embodiment," or "an example embodiment" meaning that a particular described feature, structure, or characteristic is included in at least one embodiment. Thus, usage of such phrases may refer to more than just one embodiment. Furthermore, the described features, structures, or characteristics may be combined in any suitable manner in one or more embodiments.

One skilled in the relevant art may recognize, however, that embodiments may be practiced without one or more of the specific details, or with other methods, resources, materials, etc. In other instances, well known structures, resources, or operations have not been shown or described in detail merely to avoid obscuring aspects of the embodiments.

While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems disclosed herein without departing from the scope of the claimed invention.

What is claimed is:

1. A method for rendering shapes on a computing device using a processor, the method comprising:

receiving a 2D shape that has 3D effects at a 2D/3D engine, wherein the 2D/3D engine comprises a 3D modeling factory, a front face factory, a ground plane factory and a compositing engine; wherein the received shape includes a 2D surface and text positioned directly on the 2D surface; wherein dimensions of the text included in the shape are defined independent of dimensions of the 2D surface; wherein each character of the text positioned on the 2D surface is a different shape from the 2D shape upon which the text is positioned and wherein an area of the text is smaller than an area of the 2D shape;

using the front face factory of the 2D/3D engine to dissemble the received 2D shape into parts comprising: text included in the shape; a 2D surface of the front face; 3D effects applied to the text; ground plane effects that are rendered into a ground plane of the shape and a geometry of the shape;

using the front face factory for rendering 2D shape effects on the ground plane, wherein the 2D shape effects comprise at least one of a shadow effect, a blur effect, and a reflection effect;

using the ground plane factory for creating a text ground plane that is separate from a ground plane of the shape;

using the front face factory for rendering 2D text effects, 2D shape effects, 2D surface effects and the geometry of the 2D shape;

using the front face factory in creating a bitmap from the rendering of each of the 2D text effects, the 2D shape effects, the 2D surface effects and the geometry of the 2D shape, wherein 3D effects are selectively applied to the text and the 2D surface such that the bitmap includes a 3D background object with a visible surface finish defined in response to the 2D surface and a 3D text object defined in response to the text;

rendering the 2D shape with the applied 3D effect;

using the 3D modeling factory of the 2D/3D engine to generate a 3D model from the 2D shape by defining extrusion and beveling properties of the 2D shape and creating a bevel;

using the 3D modeling factory of the 2D/3D engine to generate coordinates for mapping the bitmap onto a front face of the 3D model; and using the 3D modeling factory to apply the 2D surface effects around the bevel.

2. The method of claim 1 further comprising selectively applying (506) one or more 2D shape effects to the 2D shape.

3. The method of claim 1 further comprising:
selectively creating a ground plane for the 2D shape (508); and
selectively associating one or more 2D shape effects to the 2D shape's ground plane.

4. The method of claim 1 wherein the set further comprises: text included in the 2D shape, and 3D effects to be applied to the text.

5. The method of claim 4 further comprising (502, 510), if the 2D shape includes text, selectively applying text effects to the text.

6. The method of claim 4 further comprising (504), if the 2D shape includes text with 3D effects to be applied, selectively creating a text ground plane and associating one or more 3D text effects with the text ground plane.

7. The method of claim 1 further comprising (512), selectively applying surface effects to the 2D shape.

8. The method of claim 7 further comprising (514), selectively creating a texture map is using the 2D surface effects or 2D text effects applied to text included in the 2D shape, or both.

9. The method of claim 1 further comprising (516), obtaining a 2D geometry from the 2D shape.

10. The method of claim 9 further comprising (518), generating a 3D model from the 2D geometry.

11. The method of claim 10 further comprising (520), mapping a texture map onto the 3D model, wherein the texture maps is created using 2D surface effects applied to the 2D shape or 2D text effects applied to text included in the 2D shape, or both.

12. One or more computer-readable storage media having stored thereon instructions that when executed by a computer implement the method of claim 1.

13. A system for rendering shapes, the system comprising:
means for receiving a 2D shape that has 3D effects at a 2D/3D engine, wherein the 2D/3D engine comprises a 3D modeling factory, a front face factory, a ground plane factory and a compositing engine; wherein the received shape includes a 2D surface and text positioned directly on the 2D surface; wherein dimensions of the text included in the shape are defined independent of dimensions of the 2D surface; wherein each character of the text positioned on the 2D surface is a different shape from the 2D shape upon which the text is positioned and wherein an area of the text is smaller than an area of the 2D shape;
means for using the front face factory of the 2D/3D engine to dissemble the received 2D shape into parts comprising: text included in the shape; a 2D surface of the front face; 3D effects applied to the text; ground plane effects that are rendered into a ground plane of the shape and a geometry of the shape;
means for using the front face factory for rendering 2D shape effects on the ground plane, wherein the 2D shape effects comprise at least one of a shadow effect, a blur effect, and a reflection effect;
means for using the ground plane factory for creating a text ground plane that is separate from a ground plane of the shape;
means for using the front face factory for rendering 2D text effects, 2D shape effects, 2D surface effects and the geometry of the 2D shape;
means for using the front face factory in creating a bitmap from the rendering of each of the 2D text effects, the 2D shape effects, the 2D surface effects and the geometry of the 2D shape, wherein 3D effects are selectively applied to the text and the 2D surface such that the bitmap includes a 3D background object with a visible surface finish defined in response to the 2D surface and a 3D text object defined in response to the text;
means for rendering the 2D shape with the applied 3D effect;
means for using the 3D modeling factory of the 2D/3D engine to generate a 3D model from the 2D shape by defining extrusion and beveling properties of the 2D shape and creating a bevel;
means for using the 3D modeling factory of the 2D/3D engine to generate coordinates for mapping the bitmap onto a front face of the 3D model; and
means for sing the 3D modeling factory to apply the 2D surface effects around the bevel.

14. The system of claim 13 further comprising:
means for selectively applying (506) one or more 2D shape effects to the 2D shape;
means for selectively creating a ground plane for the 2D shape (508); and
means for selectively associating one or more 2D shape effects to the 2D shape's ground plane.

15. The system of claim 13 further comprising means for (504) selectively creating a text ground plane and associating one or more 3D text effects with the text ground plane.

16. The system of claim 13 further comprising:
means for (512) selectively applying surface effects to the 2D shape;
means for (514) selectively creating a texture map is using the 2D surface effects or 2D text effects applied to text included in the 2D shape, or both.

17. The system of claim 13 further comprising:
means for (516) obtaining a 2D geometry from the 2D shape;
means for (518) generating a 3D model from the 2D geometry; and
means for (520) mapping a texture map onto the 3D model, wherein the texture maps is created using 2D surface effects applied to the 2D shape or 2D text effects applied to text included in the 2D shape, or both.

18. A system for rendering shapes, the system comprising:
an engine to receive an indication to apply 3D effects to a 2D shape, the engine further comprising:
a 3D modeling component to generate a 3D model of selected shape parameters;
a front face component to generate 2D text, text effects and 2D shape effects to be applied to a 2D shape that includes a 2D surface and text; wherein dimensions of the text are defined independent of dimensions of the 2D surface; wherein each character of the text positioned on the 2D surface is a different shape from the 2D shape upon which the text is positioned and wherein an area of the text is smaller than an area of the 2D shape;
a ground plane component to generate effects that are rendered on a ground plane of a shape; wherein 2D shape effects are rendered on the ground plane, wherein the 2D shape effects comprise at least one of a shadow effect, a blur effect, and a reflection effect;
creating a bitmap from a rendering of the 2D text effects, the 2D shape effects, the 2D surface effects and the geometry of the 2D shape;
a 3D modeling factory to generate a 3D model from the 2D shape by defining extrusion and beveling properties of the 2D shape and creating a bevel, the 3D modeling factory generating coordinates for mapping the bitmap onto a front face of the 3D model; and a rasterizer/compositing engine to combine into an image 2D and 3D effects generated by the front face component, ground plan component, and the 3D modeling component; wherein 3D effects are selectively applied to the text included within the shape and to the geometry of the shape such that the image includes a 3D background object with a visible surface finish defined in response to the 2D surface and a 3D text object defined in response to the text; wherein the 3D background object includes the appearance of a non-zero height, a non-zero width and a non-zero depth.

19. The system of claim 18 wherein the front face component is further to selectively render 2D text effects, 2D shape effects, 2D surface effects, and the 2D geometry of the 2D shape, and is further to selectively create a texture map using the rendered 2D text effects and 2D surface effects for the front face of the 2D shape.

20. The system of claim 19 wherein the 3D modeling component is further to generate coordinates for mapping the texture onto the front face of the 3D model.

* * * * *